United States Patent
Poschmann et al.

(10) Patent No.: US 8,590,648 B2
(45) Date of Patent: Nov. 26, 2013

(54) MIXED HYBRID

(75) Inventors: Oliver Poschmann, Weil der Stadt (DE); Martin Roth, Rutesheim (DE); Klaus Bastian, Neuhausen (DE); Marco Fleckner, Leonberg (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 320 days.

(21) Appl. No.: 12/906,383

(22) Filed: Oct. 18, 2010

(65) Prior Publication Data

US 2011/0094809 A1    Apr. 28, 2011

(30) Foreign Application Priority Data

Oct. 28, 2009  (DE) .......................... 10 2009 050 957

(51) Int. Cl.
*B60K 6/44*    (2007.10)

(52) U.S. Cl.
USPC .................. 180/65.22; 180/65.23; 180/65.24; 180/65.285

(58) Field of Classification Search
USPC .................. 180/65.225, 65.23, 65.24, 65.285
See application file for complete search history.

(56) References Cited

U.S. PATENT DOCUMENTS

| | | | |
|---|---|---|---|
| 6,209,672 B1 | 4/2001 | Severinsky | |
| 6,328,122 B1* | 12/2001 | Yamada et al. | 180/65.23 |
| 7,125,362 B2 | 10/2006 | Beaty et al. | |
| 7,841,433 B2 | 11/2010 | Soliman et al. | |
| 7,871,348 B2 | 1/2011 | Perkins | |
| 2005/0164827 A1* | 7/2005 | Beaty et al. | 477/3 |
| 2008/0196954 A1 | 8/2008 | Soliman et al. | |
| 2009/0005215 A1* | 1/2009 | Silveri et al. | 477/5 |

FOREIGN PATENT DOCUMENTS

DE  10 2007 002 734  7/2008
DE      10207004462  7/2008

* cited by examiner

*Primary Examiner* — Hau Phan
*Assistant Examiner* — Bryan Evans
(74) *Attorney, Agent, or Firm* — Gerald E. Hespos; Michael J. Porco; Matthew T. Hespos

(57) ABSTRACT

A hybrid drive train for a vehicle has an internal combustion engine, first and second electric machines and a transmission that are mechanically connected to one another to drive at least one axle of the vehicle. The internal combustion engine (1) and the first electric machine (2) are provided on an input shaft of the transmission (3), and the second electric machine (4) is provided on an output shaft (6) of the transmission or on an axle of the vehicle. The maximum power and/or the maximum torque of the internal combustion engine are/is substantially larger than the power or torque that can be transmitted by the transmission.

15 Claims, 1 Drawing Sheet

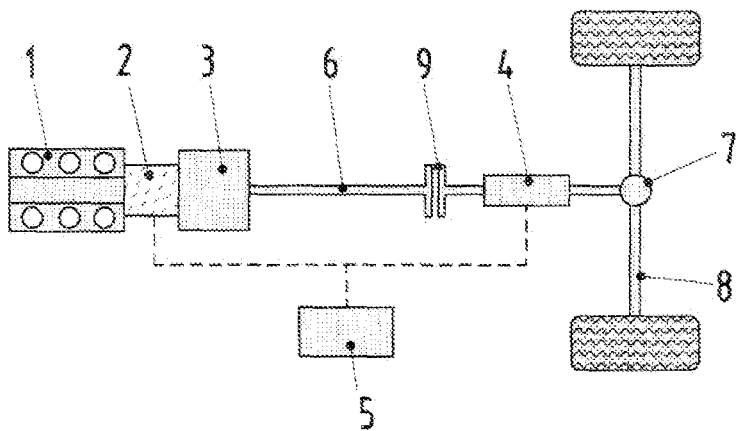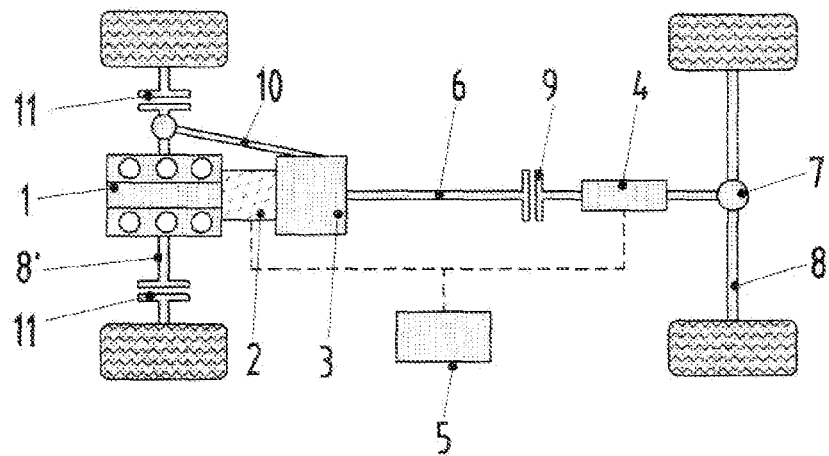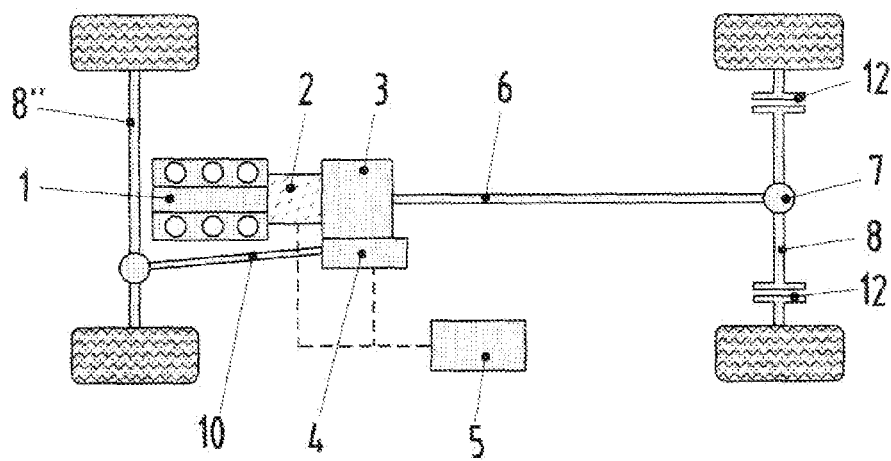

MIXED HYBRID

CROSS-REFERENCE TO RELATED APPLICATION

This application claims priority under 35 USC 119 to German Patent Application No. 10 2009 050 957.7 filed on Oct. 28, 2009, the entire disclosure of which is incorporated herein by reference.

BACKGROUND OF THE INVENTION

1. Field of the Invention

The invention relates to a drive train for a hybrid vehicle, comprising a parallel-hybrid partial train and a serial-hybrid partial train.

2. Description of the Related Art

Drive trains for hybrid vehicles are known in various embodiments. For example, a parallel-hybrid has an internal combustion engine and an electric machine arranged in a way to apply power or torque individually or communally to the drive train to drive the hybrid vehicle. Thus, the electric machine can assist the internal combustion engine. Furthermore, a serial-hybrid has an internal combustion engine that drives an electric machine, which is operated as a generator. Electric current generated in this manner is fed to an electric accumulator, such as a battery, and/or is used to supply an electric machine that is operated as a motor. This permits consumption-optimized operation of the internal combustion engine at the best point.

Combinations of a serial-hybrid drive with a parallel-hybrid drive are known. For example, DE 10 2007 002 734 A1 shows a combined drive train that uses a planetary gear mechanism to couple the torques of the internal combustion engine, the two electric machines and the transmission.

The object of the invention is to provide a drive train that is of simple design and can be used universally, as a combination of a serial-hybrid with a parallel-hybrid. The object of the invention also is to provide a method for operating a corresponding drive train.

SUMMARY OF THE INVENTION

The invention relates to a drive train of a mixed hybrid with a transmission that is configured for transmitting a substantially lower maximum power or a substantially lower maximum torque than can be supplied at maximum by the internal combustion engine. In this context, significantly lower means, for example, lower by a half or by a third. For this purpose, the internal combustion engine has a first electric machine on an input shaft of the transmission and at least one second electric machine provided on the output shaft of the transmission or provided for acting on an axle of the vehicle. In this context, the at least one second electric machine is understood to include designs that have two or more electric machines instead of one electric machine.

"Transmission downsizing" permits transmission-internal clutches with fewer disks, since the maximum torque that has to be transmitted is lower. As a result, fewer losses occur in the transmission. In addition, the transmission can have a simplified design, for example by reducing the number of gear stages, the spacing and/or stepping. It is therefore possible, for example, to allow fewer gear stages to occur or to configure gear stages for different maximum torques.

The invention provides several advantages. For example, the hybrid drive train of this mixed hybrid is operated both in a serial-hybrid and in a parallel-hybrid fashion. Only the maximum power level that can be transmitted by the transmission or the maximum torque of the internal combustion engine that can be transmitted is utilized for mechanically driving at least one axle of the vehicle. A power level of the internal combustion engine that goes beyond this level is converted into electric current by operating the first electric machine as a generator. The use of a small and lightweight transmission with a relatively high level of efficiency therefore advantageously becomes possible. In addition, instead of measures for increasing the dynamics at the internal combustion engine, for example supercharging, it is now possible to use electric machines with corresponding torque capabilities. A further advantage is that the invention provides an electric machine near the internal combustion engine and an electric machine near an axle of the vehicle. The electric machine near the internal combustion engine is particularly suitable for power shifting of the internal combustion engine. The electric machine near the axle is particularly suitable for electric travel or regeneration.

The electric machine on the transmission input shaft can be configured and dimensioned so that, during operation as a generator, it converts into electric current, at a maximum, a power level or torque of the internal combustion engine that corresponds to the difference between the maximum power level or torque of the internal combustion engine and the maximum power level or torque that can be transmitted by the transmission.

The transmission has an input shaft and an output shaft. The internal combustion engine and an electric machine are arranged on the input shaft, and a second electric machine is arranged on the output shaft of the transmission. This arrangement constitutes a simple design solution for the inventive concept. Of course, transmissions with more than one input shaft also can be used. The connections between the transmission shafts and the electric machines can be implemented in various ways, for example directly, via belts or via gearwheels.

A clutch may be arranged between the transmission and second electric machine. The clutch may, for example, be a wet clutch or a dry clutch. Opening the clutch easily permits serial-hybrid operation of the drive train. In this case, the internal combustion engine applies power to the first electric machine, which is operated as a generator. The generated current may be supplied to the second electric machine, which is operated as a motor, or is stored in an electric accumulator, such as a high-voltage battery.

A mechanical all-wheel drive can be implemented easily by virtue of the fact that the transmission has first and second output shafts. The second electric machine is arranged on the first output shaft of the transmission and the second output shaft can drive a further axle of the vehicle.

The additional shaft or the wheels of the axle driven by the additional shaft preferably can be decoupled. This permits purely electric drive of the vehicle when the clutch or clutches are opened.

The electric machine on the transmission input shaft preferably can be operated as a generator. This is advantageous during the power shifting of the internal combustion engine due to the proximity of this electric machine to the internal combustion engine.

The internal combustion engine of the hybrid drive train of the invention preferably applies power or torque mechanically to the transmission up to the maximum permissible power level or torque of the transmission. A power level or torque of the internal combustion engine that goes beyond this maximum level then is applied to the first electric machine, which is operated as a generator, and is converted into electric current. Thus, efficient electric motors can be used together with transmissions that are of compact design. The second electric machine preferably can be operated as a motor in the hybrid drive train of the invention. This second electric machine is near the axle and therefore is arranged in a favorable way for electric travel or boosting the hybrid vehicle.

Regeneration with the hybrid drive train of the invention preferably is carried out by the second electric machine, which is particularly suitable for this function by virtue of its position near to the axle.

BRIEF DESCRIPTION OF THE DRAWINGS

FIGS. 1 to 3 schematically illustrate three possible embodiments of the hybrid drive train of the invention.

DETAILED DESCRIPTION OF THE PREFERRED EMBODIMENTS

A first embodiment of the invention is illustrated in FIG. 1 and has an internal combustion engine 1 and a first electric machine 2, both of which are arranged on the input shaft of a transmission 3. The transmission 3 can be an automatic transmission. The first electric machine 2 can be an asynchronous three-phase current machine connected directly to the input shaft of the transmission 3. The maximum power level or torque that can be transmitted by the transmission 3, and that can be transmitted to the transmission output shaft 6, is significantly lower than the maximum power level or torque that can be generated by the internal combustion engine 1. In this context, significantly lower means, for example, lower by half or by a third. For example, the internal combustion engine 1 has a maximum torque of 700 Nm, while the transmission 3 can transmit a maximum torque of 400 Nm. In this case, the first electric machine 2 could be configured as a generator for a torque of approximately 300 Nm during operation. The maximum torque of 700 Nm that can be generated by the internal combustion engine 1 would therefore correspond precisely to the sum of the maximum torque of 300 Nm can that be absorbed by the electric machine 2 operated as a generator, and the torque of 400 Nm that can be transmitted by the transmission 3.

A second electric machine 4 is arranged on the transmission output shaft 6. A further transmission also may be provided between the second electric machine 4 and the transmission output shaft 6. The transmission output shaft 6 extends to a differential 7 for driving an axle 8 of the vehicle. Alternatively, two second electric machines 4 may be provided on the outputs of the differential 7 for driving the axle 8 of the vehicle and, if appropriate, a transmission may be provided in each case. The transmission output shaft 6 optionally has a clutch 9 between the second electric machine 4 and the transmission 3. The internal combustion engine 1 can drive the axle 8 mechanically via the transmission 3 by means of the differential 7 if the clutch 9 is closed. The axle 8 is connected mechanically only to the electric machine 4 by means of the differential 7 if the clutch 9 is opened. The transmission 3 is shifted to the neutral position so that the axle 8 is mechanically connected only to the electric machine 4 if the optional clutch 9 is not present.

An electric accumulator 5, such as a high-voltage battery, is connected via high-voltage leads to the first and second electric machines 2 and 4. Corresponding control devices or power electronics are not illustrated for simplicity.

The drive train can be driven in a conventional way by the internal combustion engine 1, and in this example, a maximum torque of 400 Nm can be transmitted from the internal combustion engine 1 to the axle 8 via the transmission 3 by means of the differential 7.

The first electric machine 2 can be operated as a generator to charge the electric accumulator 5 and/or to supply further electric loads of the vehicle, such as the second electric machine 4. The second electric machine 4 then can be used, in addition to the internal combustion engine 1, to drive the axle 8. Such high-load operation splits the maximum power of the internal combustion engine 1 into a mechanical part and an electric part. The mechanical part is 400 Nm in this case and is applied to the transmission output shaft 6 via the transmission 3. The electric part is implemented by current from the first electric machine 2 operated as a generator and/or the electric accumulator 5. This current supplies the second electric machine 4, which is operated as a motor. Accordingly, this electric part also is applied to the transmission output shaft 6 in accordance with the torque of the second electric machine 4.

A serial-hybrid operation is possible by operating the first electric machine 2 as a generator with the clutch 9 opened or with the transmission 3 shifted to neutral. The first electric machine 2 is driven by the internal combustion engine 1 to generate electric current. The electric current is stored in the electric accumulator 5 and/or used to supply the second electric machine 4. The second electric machine 4 thus drives the axle 8 via the differential 7. Such serial-hybrid operation can be provided continuously or intermittently. This permits, for example, heating of the catalytic converter of the internal combustion engine 1 in a way that is decoupled from the speed of the vehicle to optimize the heating of the catalytic converter and therefore improve the exhaust emissions of the internal combustion engine 1.

Regeneration preferably is carried out by the second electric machine 4. In this context, the internal combustion engine 1 is switched off and the clutch 9 is opened. The clutch 9 can be closed if harder braking is required during regeneration and kinetic energy therefore can be transmitted via the transmission input shaft 6 to the electric machine 2, which then additionally is operated as a generator.

Serial-hybrid operation preferably is provided during cold starting of the hybrid drive train until sufficient dissipated heat of the internal combustion engine 1 is available to warm the oil of the transmission 3. Conventional operation with minimized loss is therefore possible when the vehicle is driven by the internal combustion engine 1.

A second embodiment is illustrated in FIG. 2 and has a transmission 3 with an additional shaft 10 for driving a second axle 8' of the vehicle. Both axles 8 and 8' are driven by the internal combustion engine 1 via the transmission 3 during conventional operation of this drive train. Two clutches 11 are provided for decoupling the wheels of the second axle 8' from the additional shaft 10. Pure electric travel is possible when the clutches 11 are opened. In this context, only the axle 8 is driven. Alternatively, instead of the two clutches 11, an individual clutch in the additional shaft 10 also is possible. The other operating states are analogous to the first embodiment of FIG. 1.

A third embodiment is illustrated in FIG. 3 and differs from the preceding embodiments in that the second electric machine 4 is not provided on the transmission output shaft 6 but rather for acting on a further axle 8". The further axle 8" therefore is embodied virtually as an electric axle. In conventional operation, the axle 8 is driven by the internal combustion engine 1 via the transmission output shaft 6. Purely electric travel is carried out by operating the second electric machine 4 as a motor for driving the further axle 8". In this context, clutches 12 are provided for decoupling the axle 8 or the wheels of the axle 8. In addition, the axle 8 can be driven only by the first electric machine 2 when the internal combustion engine 1 is shut down.

Serial-hybrid operation is possible when the first electric machine 2 is operated as a generator and when the second electric machine 4 simultaneously is operated as a motor. It also is possible again to provide continuous serial-hybrid operation or intermittent serial-hybrid operation. An all-wheel drive is provided as a high-load operating means. In this context, the power of the internal combustion engine 1 is apportioned to a conventional component and is applied mechanically to the vehicle axle 8 via the transmission 3. In addition, a serial component is configured to supply the second electric machine 4 with electric current via the first electric machine 2 which is operated as a generator, if appropriate also from the electric accumulator 5. The regeneration in turn is carried out by the second electric machine 4 which is near to the axle and is operated as a generator. In this context, the first electric machine 2 also can operate as a generator to boost braking.

To summarize, the invention presents a mixed hybrid with transmission downsizing. The drive train has a parallel-hybrid partial train and a serial-hybrid partial train. The torque or the power level of the internal combustion engine is applied only up to the input torque permissible by the transmission through the parallel-hybrid partial train for driving the vehicle. Torque or a power beyond this level is implemented in a serial-hybrid fashion to drive the vehicle. The drive train preferably is configured so that torque or a power level of the internal combustion engine is set as the sum of the power level or the torque of an electric machine and of the transmission. The mixed hybrid can also be designed to externally charge the electric accumulator at the external accumulator as what is referred to as a plug-in hybrid.

What is claimed is:

1. A hybrid drive train for a vehicle, comprising:
   an internal combustion engine, first and second electric machines and a transmission connected mechanically to one another to drive at least one axle of the vehicle, the hybrid drive train further comprising an electric accumulator, the internal combustion engine and the first electric machine being provided on an input shaft of the transmission, and the second electric machine being provided on an output shaft of the transmission for acting on an axle of the vehicle, the first electric machine being operable as a generator to charge the electric accumulator or to operate the second electric machine, a maximum power or a maximum torque that can be transmitted by the transmission being substantially less than a maximum power or a maximum torque of the internal combustion engine and a difference between the maximum power or the maximum torque of the internal combustion engine and the maximum power or a maximum torque that can be transmitted by the transmission operating the first electric machine as a generator to charge the electric accumulator or to operate the second electric machine.

2. The hybrid drive train of claim 1, wherein the output shaft of the transmission is provided for driving the axle of the vehicle.

3. The hybrid drive train of claim 2, further comprising a clutch between the transmission and the second electric machine.

4. The hybrid drive train of claim 3, further comprising an additional shaft extending from the transmission to a further axle of the vehicle for driving the further axle.

5. The hybrid drive train of claim 4, wherein the additional shaft or wheels of the further axle driven by the additional shaft are configured to be decoupled.

6. A method for operating the hybrid drive train of claim 1, comprising operating the first electric machine as a generator, applying power of the internal combustion engine to the transmission up to a power level that can be transmitted by the transmission, and applying to the first electric machine power of the internal combustion engine that goes beyond the power level that can be transmitted by the transmission.

7. The method of claim 6, further comprising operating the second electric machine as a motor.

8. The method of claim 6, wherein a clutch is provided for selectively decoupling the transmission from the driven axle, and wherein the method further comprises opening the clutch so that the internal combustion engine drives only the first electric machine which is operated as a generator.

9. A regeneration method for the hybrid drive train of claim 1, comprising operating the second electric machine as a generator.

10. A cold starting method for the hybrid drive train of claim 1, operating the hybrid drive train in a serial-hybrid mode until sufficient dissipated heat of the internal combustion engine is available to warm up oil of the transmission.

11. A method for operating a mixed hybrid vehicle, comprising:
    operating an internal combustion engine to produce an output power;
    applying to a transmission a first portion of the output power of the internal combustion engine, the first portion of the output power of the internal combustion engine substantially corresponding to a maximum power level that can be transmitted by the transmission;
    applying to a first electric machine a second portion of the output power of the internal combustion engine, the second portion of the output power of the internal combustion engine being the output power of the internal combustion engine that goes beyond the maximum power level that can be transmitted by the transmission; and
    using the electric machine as a generator for recharging an electric accumulator or for powering a second electric machine as a motor for delivering driving power to at least one axle of the vehicle.

12. The method of claim 11, further comprising selectively coupling the transmission to at least one axle of the vehicle for driving the axle.

13. The method of claim 11, further comprising decoupling the transmission from the axle so that only the second electric machine delivers the driving power to the axle.

14. The method of claim 11, wherein a maximum power level that can be transmitted by the transmission is at least one third less than a maximum output power of the internal combustion engine.

15. The hybrid drive train of claim 1, wherein the maximum power or maximum torque that can be transmitted by the transmission is at least one third less than a maximum power or maximum torque of the internal combustion engine.

* * * * *